US012633676B2

(12) United States Patent
Chen et al.

(10) Patent No.: US 12,633,676 B2
(45) Date of Patent: May 19, 2026

(54) HIGH-GAIN ANTENNA AND ANTENNA ARRAY

(71) Applicant: Alpha Networks Inc., Hsinchu (TW)

(72) Inventors: Yao-Jen Chen, Hsinchu (TW); Chia-Hsien Chen, Hsinchu (TW)

(73) Assignee: ALPHA NETWORKS INC., Hsinchu (TW)

( * ) Notice: Subject to any disclaimer, the term of this patent is extended or adjusted under 35 U.S.C. 154(b) by 36 days.

(21) Appl. No.: 18/811,377

(22) Filed: Aug. 21, 2024

(65) Prior Publication Data

US 2025/0329941 A1 Oct. 23, 2025

(30) Foreign Application Priority Data

Apr. 17, 2024 (TW) ................................ 113114315

(51) Int. Cl.
*H01Q 9/04* (2006.01)
*H01Q 19/00* (2006.01)
*H01Q 21/06* (2006.01)

(52) U.S. Cl.
CPC ......... *H01Q 21/065* (2013.01); *H01Q 19/005* (2013.01)

(58) Field of Classification Search
CPC .... H01Q 21/065; H01Q 19/005; H01Q 5/378; H01Q 9/0435; H01Q 9/0414
See application file for complete search history.

(56) References Cited

U.S. PATENT DOCUMENTS 5,995,047 A * 11/1999 Freyssinier .......... H01Q 9/0435 343/846

FOREIGN PATENT DOCUMENTS

CN 116169472 A 5/2023
TW 202335369 A 9/2023

OTHER PUBLICATIONS

Search Report appended to an Office Action, which was issued to Taiwanese counterpart application No. 113114315 by the TIPO on Feb. 3, 2025, with an English translation thereof (2 pages).
Xia Haiyang et al., "A Cost-Effective Wideband Dual-Polarized L-Shaped Probe-Fed Phased Array Antenna for 60-GHz AiP Applications", IEEE Transactions on Components, Packaging, and Manufacturing Technology, vol. 13, No. 11, Nov. 2023, pp. 1790-1803.
(Continued)

*Primary Examiner* — David E Lotter
(74) *Attorney, Agent, or Firm* — HSML P.C.

(57) ABSTRACT

An antenna includes a first substrate, a second substrate, a ground layer and a third substrate stacked from top to bottom, a driving patch disposed below the first substrate, and a first feed-in line and a second feed-in line disposed below the third substrate. The antenna further includes a first feed-out probe and a second feed-out probe, each of which extends from below the driving patch, and penetrates the second substrate, the ground layer and the third substrate. The first feed-out probe and the second feed-out probe respectively connects the first feed-in line and the second feed-in line to the driving patch, so as to transmit a first signal and a second signal received by the first feed-in line and the second feed-in line to the driving patch respectively through the first feed-out probe and the second feed-out probe for the driving patch to output an output electromagnetic wave.

12 Claims, 9 Drawing Sheets

(56) References Cited

OTHER PUBLICATIONS

García-Aguilar A. et al., "Printed Antenna for Satellite Communications", 2010 IEEE International Symposium on, IEEE, Oct. 12, 2010, pp. 529-535.
Search Report issued to European counterpart application No. 24194752.2 by the EPO on Feb. 11, 2025.

* cited by examiner

HIGH-GAIN ANTENNA AND ANTENNA ARRAY

CROSS-REFERENCE TO RELATED APPLICATION

This application claims priority to Taiwanese Invention Patent Application No. 113114315, filed on Apr. 17, 2024, the entire disclosure of which is incorporated by reference herein.

FIELD

The disclosure relates to a high-gain antenna and an antenna array, and more particularly to a high-gain antenna and an antenna array that are adapted for low-earth orbit satellite communication at a Ka frequency band.

BACKGROUND

As communication technology and integrated circuit technology advances, components of consumer electronic products are gradually being miniaturized. With the growing demands in wireless communication, consumers will be demanding for an antenna that has advantages such as a lower cost, a smaller size, and better performance. Among various antenna technologies, patch antennas not only hold the abovementioned advantages, but are also easy to manufacture, are easily integrated into other circuits, and have a high level of design diversity. As such, patch antennas are widely applied to various electronic products.

An antenna disclosed in Taiwanese Invention Patent Publication No. TW202335369A includes a substrate, a first patch set that is disposed on an upper surface of the substrate, and a second patch set that is disposed in the substrate. Each of the first patch set and the second patch set is formed by four square patches. The antenna may provide a gain of 4.4 dBi when operating in a frequency of 27 GHz, but there is still space for improvements.

SUMMARY

Therefore, an object of the disclosure is to provide a high-gain antenna and an antenna array that can alleviate at least one of the drawbacks of the prior art.

According to an aspect of the disclosure, a high-gain antenna includes a first substrate, a second substrate, a ground layer, a third substrate, a driving patch, a first feed-in line, a second feed-in line, a first feed-out probe and a second feed-out probe. The first substrate, the second substrate, the ground layer, and the third substrate are stacked from top to bottom. The driving patch is disposed on a lower surface of the first substrate and has a circular shape. The first feed-in line and the second feed-in line are disposed on a lower surface of the third substrate. Each of the first feed-out probe and the second feed-out probe extends from a lower surface of the driving patch from top to bottom, and penetrates the second substrate, the ground layer and the third substrate. The first feed-out probe is configured to electrically connect the first feed-in line and the driving patch, and the second feed-out probe is configured to electrically connect the second feed-in line and the driving patch. When a first signal and a second signal are respectively fed to the first feed-in line and the second feed-in line, the first signal is transmitted to the driving patch through the first feed-out probe, the second signal is transmitted to the driving patch through the second feed-out probe, and the driving patch outputs an output electromagnetic wave based on the first signal and the second signal.

According to another aspect of the disclosure, an antenna array includes a first antenna, a second antenna, a third antenna and a fourth antenna, each of which includes a high-gain antenna described above. A center of the second antenna is aligned with a center of the first antenna in a first direction, and the second antenna is offset from the first antenna in a counterclockwise direction by 90 degrees. A center of the third antenna is aligned with the center of the second antenna in a second direction, and the third antenna is offset from the second antenna in a counterclockwise direction by 90 degrees. A center of the fourth antenna is aligned with the center of the third antenna in the first direction, and the fourth antenna is offset from the third antenna in a counterclockwise direction by 90 degrees.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
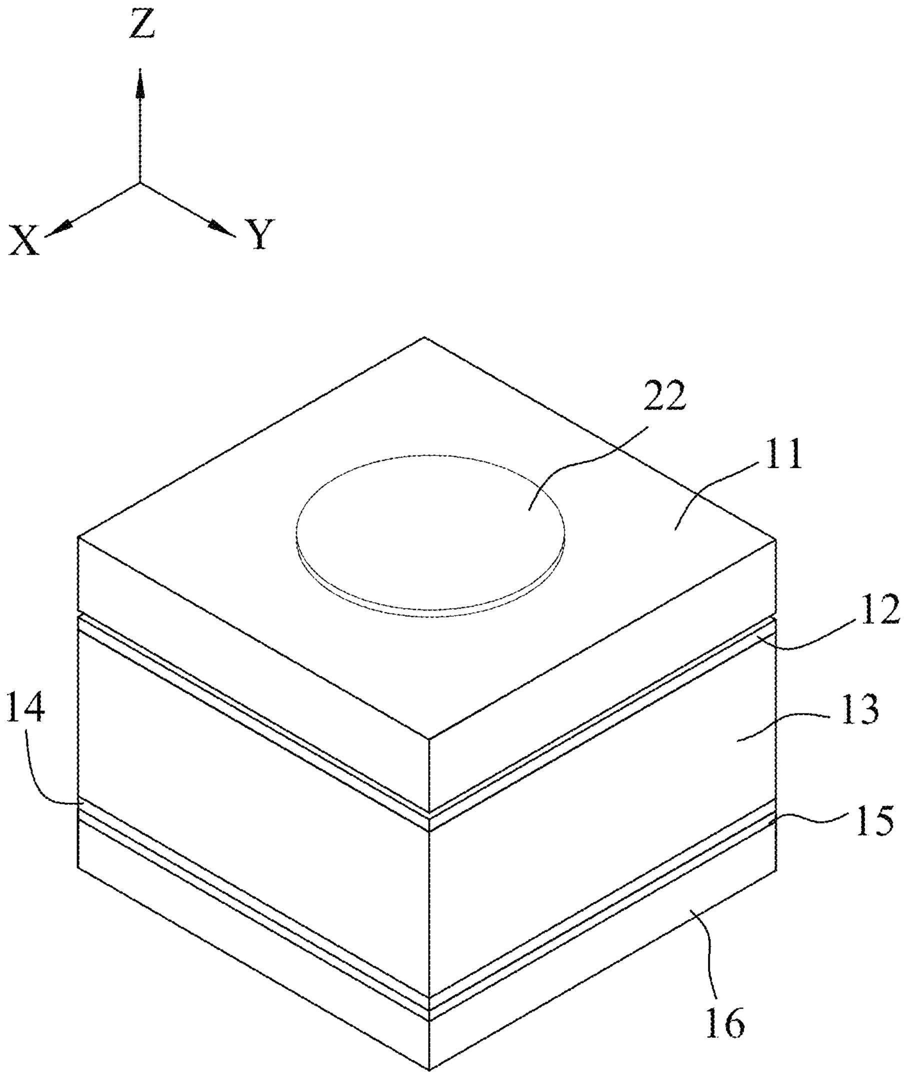
FIG. 1 is a perspective view illustrating a high-gain antenna according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
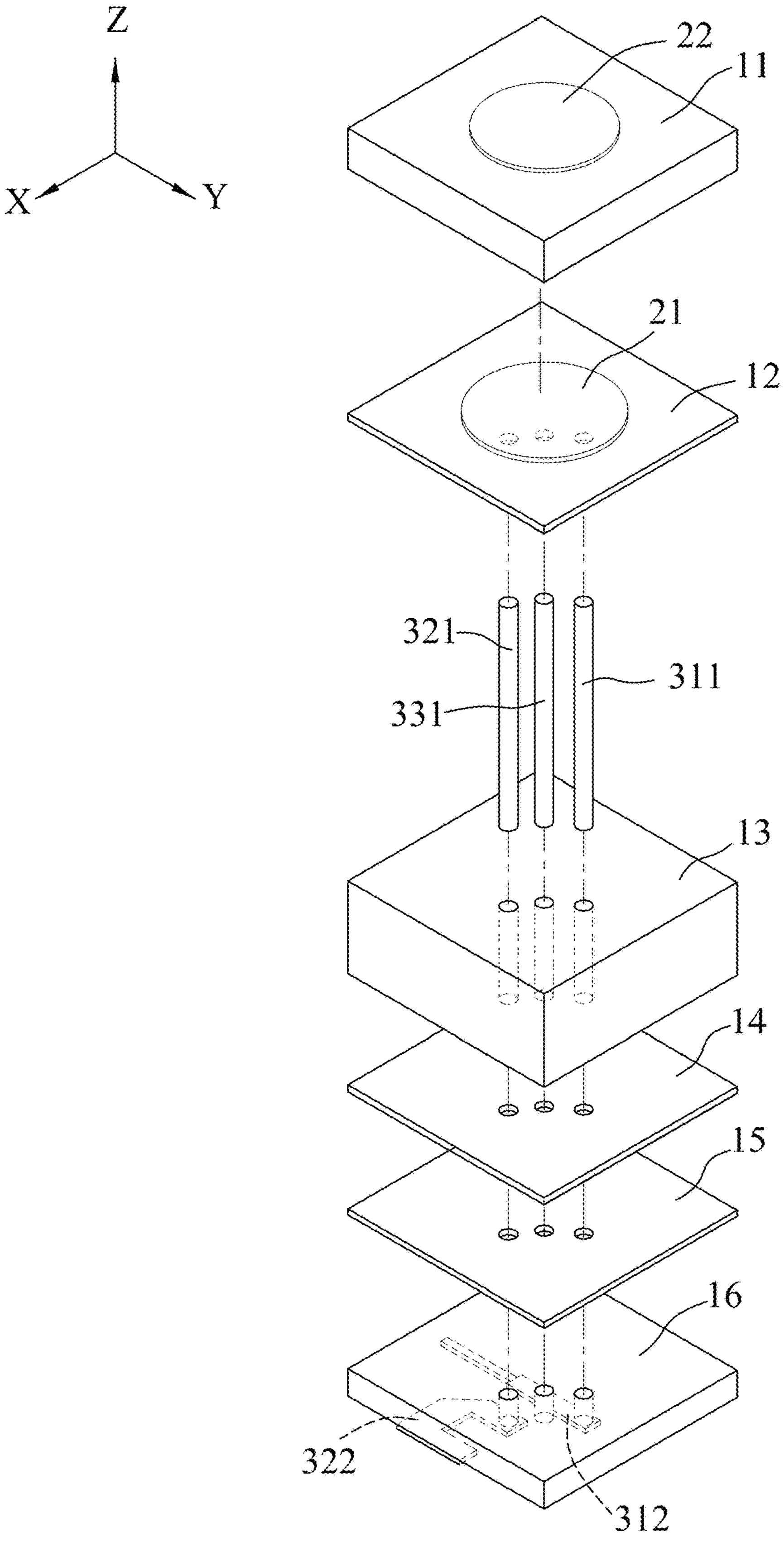
FIG. 2 is an exploded perspective view of the high-gain antenna according to the embodiment.
Figure 3:
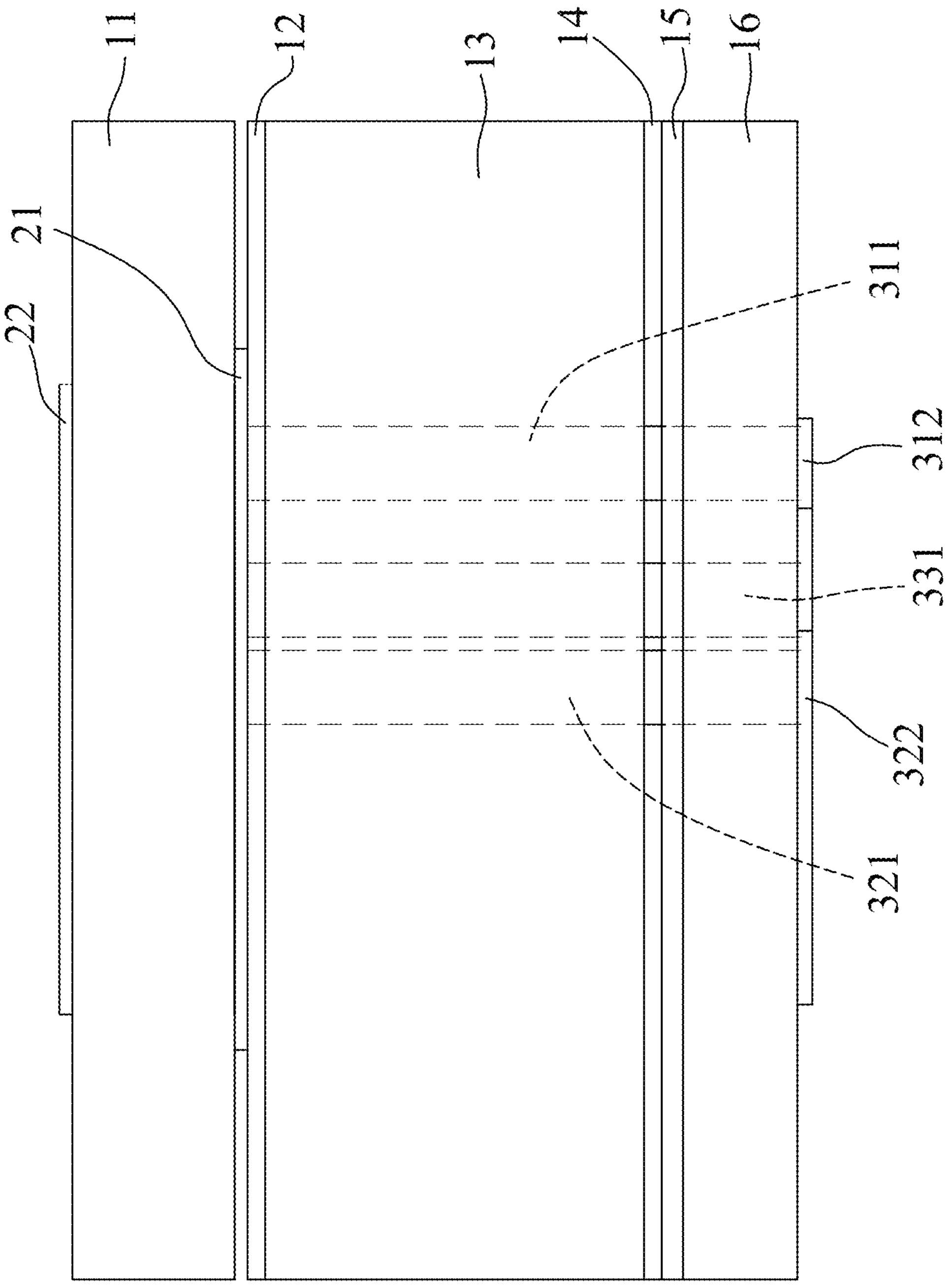
FIG. 3 is a side view of the high-gain antenna according to the embodiment.

Referring to FIGS. 1 to 3, a high-gain antenna according to an embodiment of the disclosure includes a first substrate 11, a first adhesive layer 12, a second substrate 13, a second adhesive layer 14, a ground layer 15, a third substrate 16, a driving patch 21, a parasitic patch 22, a first feed-in line 312, a second feed-in line 322, a first feed-out probe 311, a second feed-out probe 321 and a third feed-out probe 331.

The first substrate 11, the first adhesive layer 12, the second substrate 13, the second adhesive layer 14, the ground layer 15 and the third substrate 16 are stacked from top to bottom in the given order along a direction that is reverse to a Z-direction pointing from bottom to top. Each of the first substrate 11, the first adhesive layer 12, the second substrate 13, the second adhesive layer 14 and the third substrate 16 is made of a dielectric material. The ground layer 15 is made of metal.

The driving patch 21 is disposed on a lower surface of the first substrate 11, has a circular shape, is made of metal, and is configured to output an output electromagnetic wave. The parasitic patch 22 is disposed on an upper surface of the first substrate 11, has a circular shape, is made of metal, and is adapted to broaden an operating frequency band of the high-gain antenna. A projection, in the Z-direction, of a center of the parasitic patch 22 on the driving patch 21 coincides with a center of the driving patch 21. In this embodiment, a diameter of the parasitic patch 22 is smaller than a diameter of the driving patch 21.

Each of the first feed-in line 312 and the second feed-in line 322 is disposed on a lower surface of the third substrate 16, is made of metal, and communicates with a signal source (not shown) that generates signals related to the output electromagnetic wave.

Each of the first feed-out probe 311, the second feed-out probe 321, and the third feed-out probe 331 is made of metal, extends from a lower surface of the driving patch 21 from top to bottom in the direction that is reverse to the Z-direction, and penetrates the second substrate 13, the second adhesive layer 14, the ground layer 15 and the third substrate 16 in the given order.

The first feed-out probe 311 is configured to electrically connect the first feed-in line 312 and the driving patch 21, so that when a first signal (from the signal source) is fed to the first feed-in line 312, the first signal is transmitted to the driving patch 21 through the first feed-out probe 311. The second feed-out probe 321 is configured to electrically connect the second feed-in line 322 and the driving patch 21, so that when a second signal (from the signal source) is fed to the second feed-in line 322, the second signal is transmitted to the driving patch 21 through the second feed-out probe 321. The driving patch 21 may then output the output electromagnetic wave based on the first signal and the second signal thus received. The third feed-out probe 331 is configured to isolate the first signal that passes through the first feed-out probe 311 from the second signal that passes through the second feed-out probe 321, so that the first signal and the second signal does not interfere with each other.

In this embodiment, the third feed-out probe 331 is disposed between the first feed-out probe 311 and the second feed-out probe 321, and a minimum distance from the third feed-out probe 331 to the center of the driving patch 21 is smaller than a minimum distance from any one of the first feed-out probe 311 and the second feed-out probe 321 to the center of the driving patch 21.

In this embodiment, the high-gain antenna is configured to operate in a Ka-band from 27 GHz to 31 GHz (i.e., the operating frequency band of the patch antenna is from 27 GHz to 31 GHz), and can be used in a low-earth orbit satellite communication system.

Figure 4:
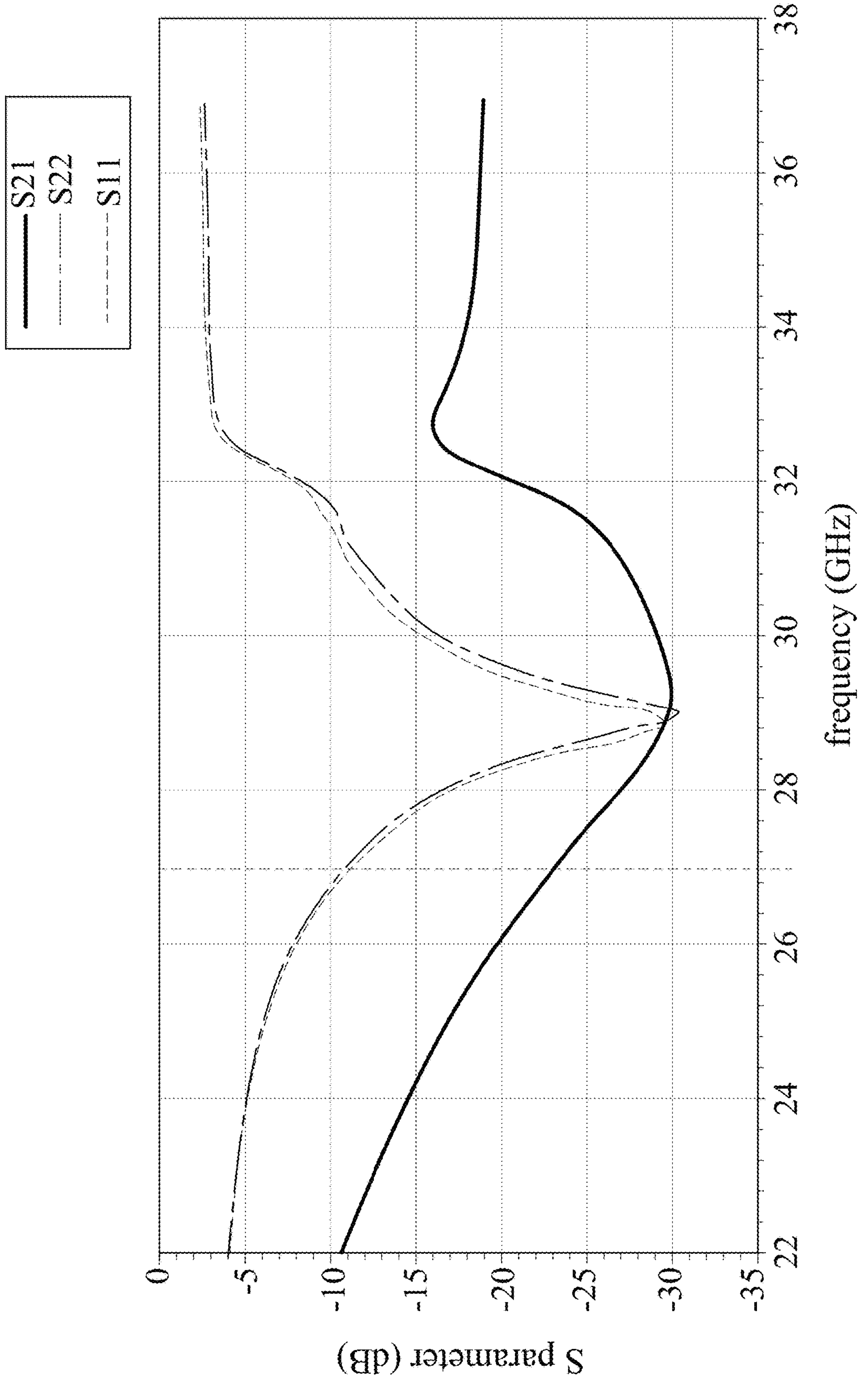
FIG. 4 is a plot illustrating various scattering parameters (S parameters) of the high-gain antenna according to the embodiment.

FIG. 4 is a plot illustrating scattering parameters (S11, S22, and S21) of the high-gain antenna of this embodiment in a frequency range of 22 GHZ to 37 GHz. Referring to FIGS. 3 and 4, the scattering parameter (S11) is a reflection coefficient at the first feed-in line 312, and is smaller than a target value of the scattering parameter (S11) (e.g., −10 dB) in the operating frequency band of the high-gain antenna. The scattering parameter (S22) is a reflection coefficient at the second feed-in line 322, and is smaller than a target value of the scattering parameter (S22) (e.g., −10 dB) in the operating frequency band of the high-gain antenna. The scattering parameter (S21) is a transmission coefficient that is related to isolation between the first feed-in line 312 and the second feed-in line 322, and is smaller than a target value of the scattering parameter (S21) (e.g., −20 dB) in the operating frequency band of the high-gain antenna.

Figure 5:
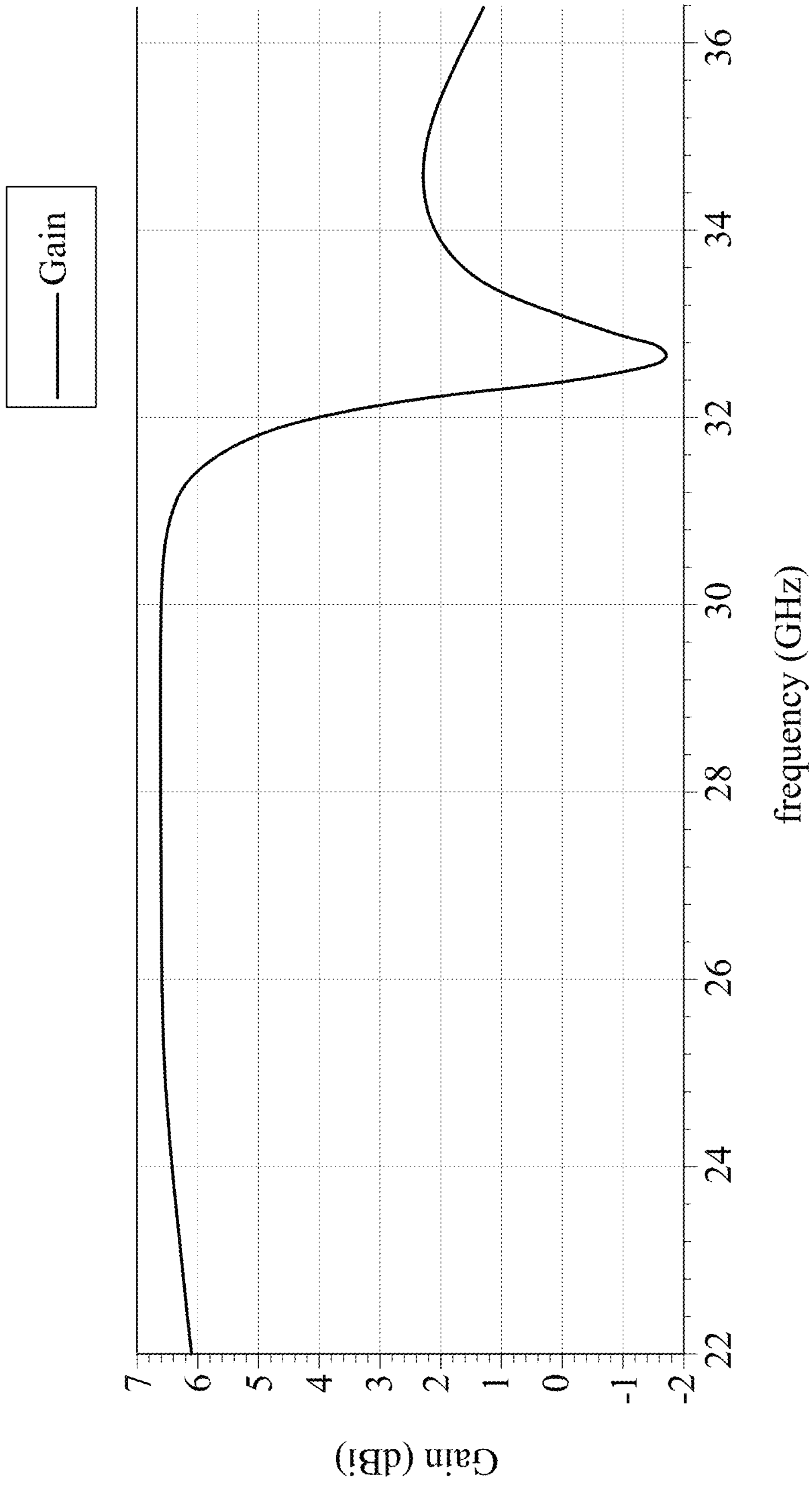
FIG. 5 is a plot illustrating a gain of the high-gain antenna according to the embodiment.

FIG. 5 is a plot illustrating a gain of the high-gain antenna of this embodiment in a frequency range of 22 GHz to 36 GHz. The gain of the high-gain antenna is close to a target value (e.g., 6.6 dBi) thereof at a central frequency of the operating frequency band of the high-gain antenna (i.e., 29 GHZ).

Figure 6:
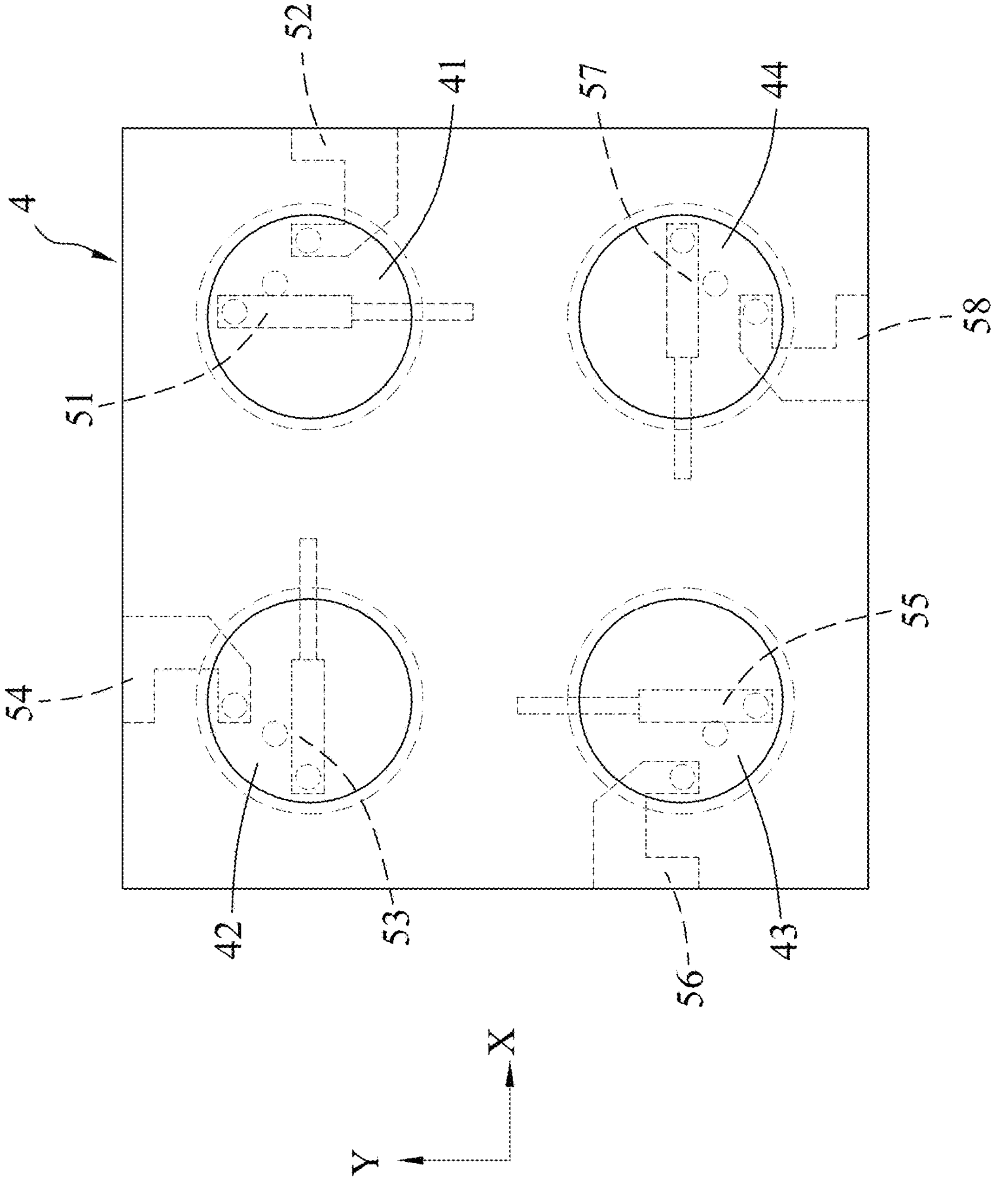
FIG. 6 is a top view illustrating an antenna array according to another embodiment of the disclosure.

Referring to FIG. 6, an antenna array 4 according to an embodiment of the disclosure includes a first antenna 41, a second antenna 42, a third antenna 43 and a fourth antenna 44, each of which includes the high-gain antenna as mentioned above. The first antenna 41 includes a first input port 51 and a second input port 52 (respectively corresponding to the first feed-in line 312 (see FIG. 2) and the second feed-in line 322 (see FIG. 2) of the high-gain antenna of the first antenna 41); the second antenna 42 includes a third input port 53 and a fourth input port 54 (respectively corresponding to the first feed-in line 312 (see FIG. 2) and the second feed-in line 322 (see FIG. 2) of the high-gain antenna of the second antenna 42); the third antenna 43 includes a fifth input port 55 and a sixth input port 56 (respectively corresponding to the first feed-in line 312 (see FIG. 2) and the second feed-in line 322 (see FIG. 2) of the high-gain antenna of the third antenna 43); and the fourth antenna 44 includes a seventh input port 57 and an eighth input port 58 (respectively corresponding to the first feed-in line 312 (see FIG. 2) and the second feed-in line 322 (see FIG. 2) of the high-gain antenna of the fourth antenna 44).

A center of the second antenna 42 is aligned with a center of the first antenna 41 in an X-direction (also referred to as a first direction), and the second antenna 42 is offset from the first antenna 41 in a counterclockwise direction by 90 degrees. A center of the third antenna 43 is aligned with the center of the second antenna 42 in a Y-direction (also referred to as a second direction) that is, for example, perpendicular to the X-direction, and the third antenna 43 is offset from the second antenna 42 in a counterclockwise direction by 90 degrees. A center of the fourth antenna 44 is aligned with the center of the third antenna 43 in the X-direction, and the fourth antenna 44 is offset from the third antenna 43 in a counterclockwise direction by 90 degrees.

In this embodiment, the antenna array 4 is configured to operate in the Ka-band from 27 GHz to 31 GHZ (i.e., an operating frequency band of the antenna array 4 is from 27 GHz to 31 GHz), and can be used in a low-earth orbit satellite communication system.

Figure 7:
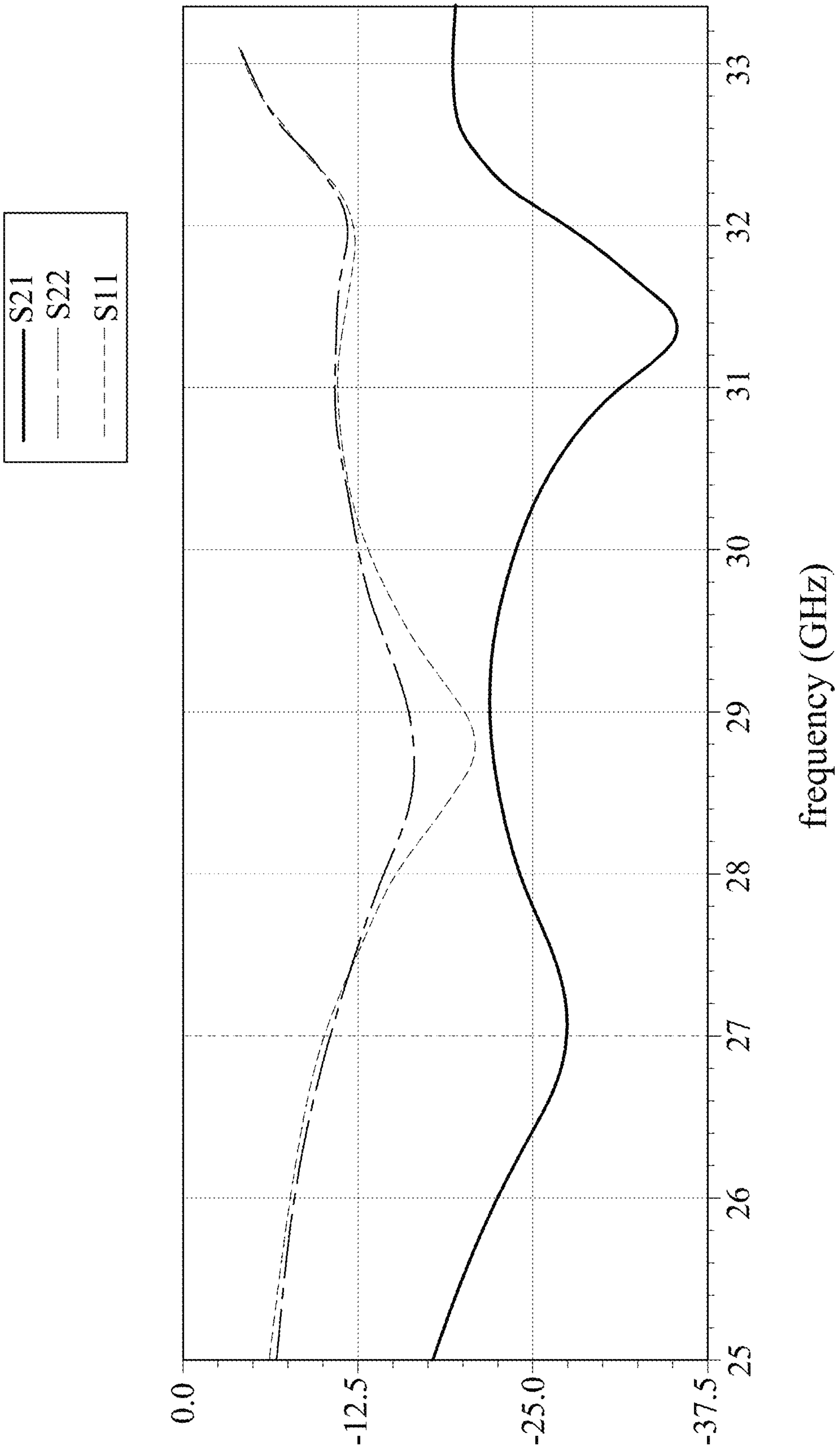
FIG. 7 is a plot illustrating various scattering parameters of the antenna array according to the another embodiment.

FIG. 7 is a plot illustrating scattering parameters (S11, S22, and S21) of each of the antennas 41-44 of the antenna array 4 (see FIG. 6) of this embodiment in a frequency range of 25 GHz to 33 GHz. Referring to FIGS. 2, 6 and 7, for each of the antennas 41-44, the scattering parameter (S11) is a reflection coefficient at the input port of the antenna that corresponds to the first feed-in line 312 (e.g., the first input port 51 of the first antenna 41), and is smaller than a target value of the scattering parameter (S11) (e.g., −10 dB) in the operating frequency band of the antenna array 4. The scattering parameter (S22) is a reflection coefficient at the input port of the antenna that corresponds to the second feed-in line 322 (e.g., the second input port 52 of the first antenna 41), and is smaller than a target value of the scattering parameter (S22) (e.g., −10 dB) in the operating frequency band of the antenna array 4. The scattering parameter (S21) is a transmission coefficient that is related to isolation between the input ports of the antenna that correspond respectively to the first feed-in line 312 and the second feed-in line 322 (e.g., the first input port 51 and the second input port 52 of the first antenna 41), and is smaller than a target value of the scattering parameter (S21) (e.g., −20 dB) in the operating frequency band of the antenna array 4.

Figure 8:
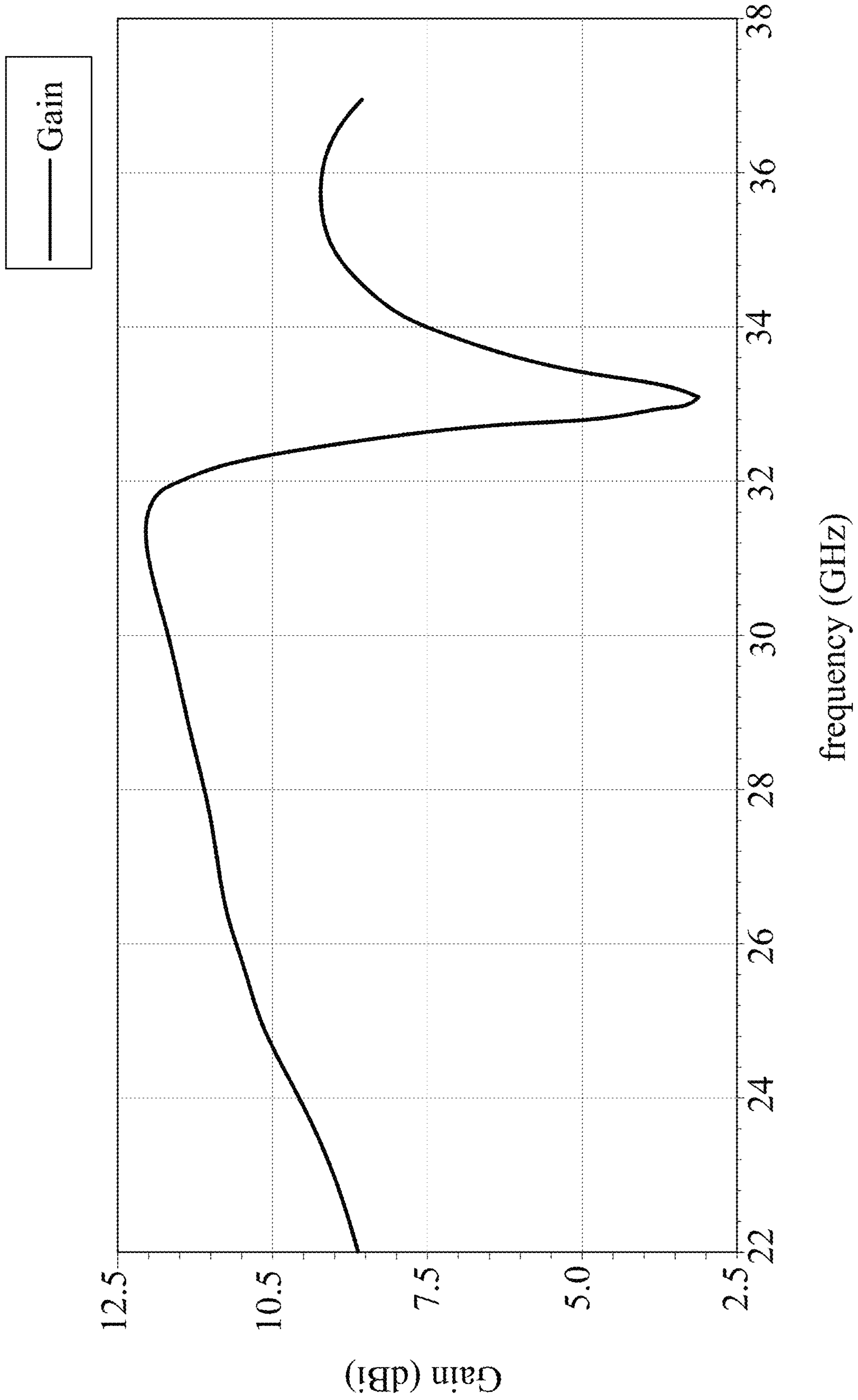
FIG. 8 is a plot illustrating a gain of the antenna array according to the another embodiment.

FIG. 8 is a plot illustrating a gain of the antenna array 4 (see FIG. 6) of this embodiment in a frequency range of 22 GHz to 37 GHz. The gain of the antenna array 4 is close to a target value (e.g., 12 dBi) thereof at a central frequency of the operating frequency band of the antenna array 4 (i.e., 29 GHZ).

Figure 9:
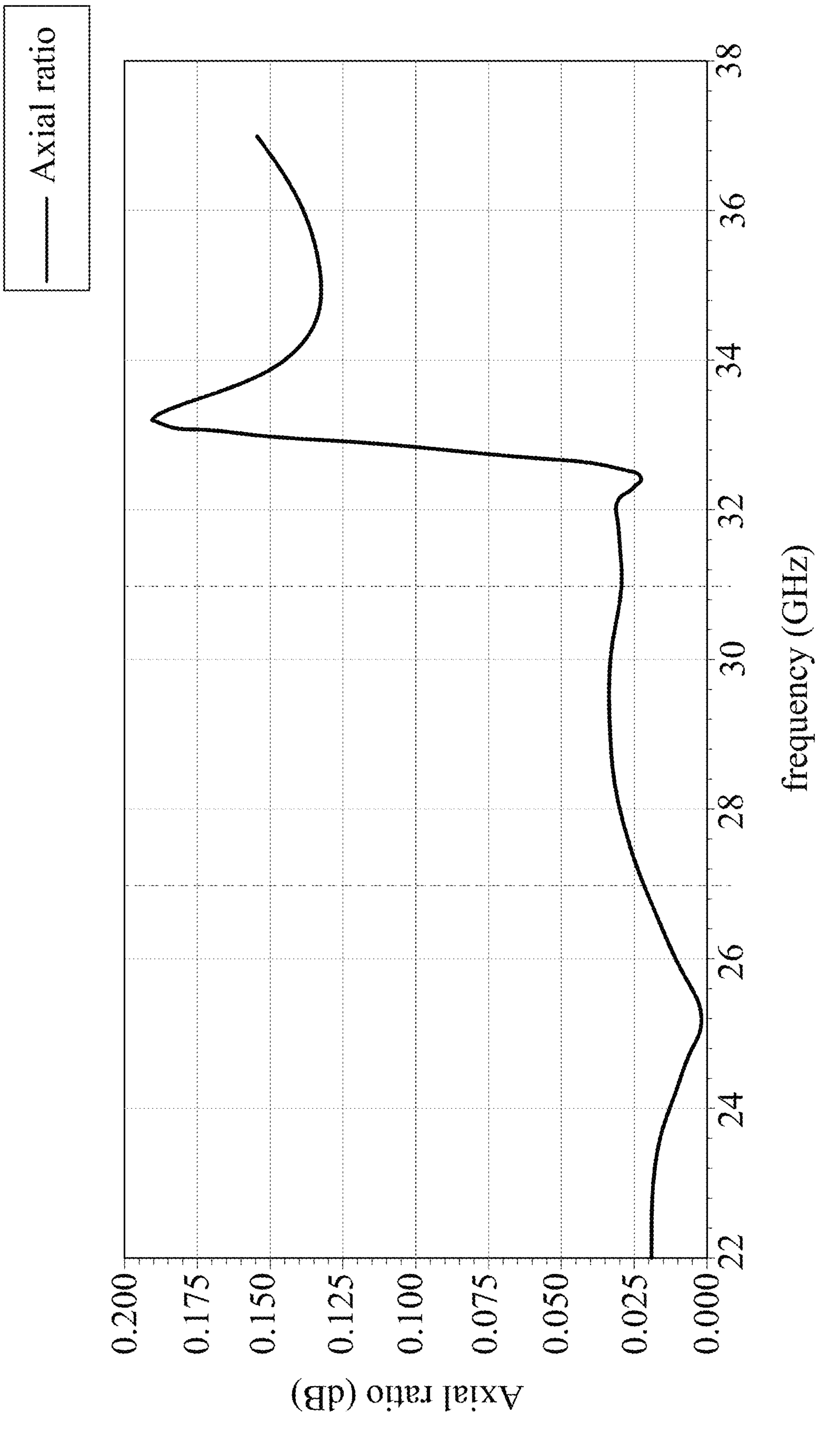
FIG. 9 is a plot illustrating an axial ratio of circular polarization of the antenna array according to the another embodiment.

FIG. 9 is a plot illustrating an axial ratio of circular polarization of the antenna array 4 (see FIG. 6) of this embodiment in a frequency range of 22 GHz to 37 GHz. As shown in FIG. 9, the axial ratio of this embodiment is smaller than a predetermined value of 0.035 dB in the operating frequency band of the antenna array 4.

Compared to one high-gain antenna, the antenna array 4 that includes multiple high-gain antennas has a higher gain, and the effect of circular polarization can be obtained without obvious cracking of the scattering parameters (S11, S22, and S21) in the operating frequency band of the antenna array 4.

Referring back to FIGS. 2 and 6, in summary, the high-gain antenna and the antenna array 4 of the disclosure has the following advantages. 1) With respect to the high-gain antenna depicted in FIG. 2, when the first signal and the second signal are respectively fed to the first feed-in line 312 and the second feed-in line 322, the first signal and the second signal are transmitted to the driving patch 21 respectively through the first feed-out probe 311 and the second feed-out probe 321, and the driving patch 21 outputs the output electromagnetic wave based on the first signal and the second signal. Such configuration of the high-gain antenna provides a better gain and allows a simpler manufacturing process for the high-gain antenna compared to the prior art. 2) With respect to the high-gain antenna depicted in FIG. 2, the parasitic patch 22 in a circular shape is disposed on the upper surface of the first substrate 11 so as to broaden the operating frequency band of the high-gain antenna. 3) With respect to the high-gain antenna depicted in FIG. 2, the diameter of the parasitic patch 22 is smaller than the diameter of the driving patch 21, so as to enhance the gain of the high-gain antenna. 4) With respect to the high-gain antenna depicted in FIG. 2, the third feed-out probe 331 isolates the first signal that passes through the first feed-out probe 311 from the second signal that passes through the second feed-out probe 321, so that the first signal and the second signal does not interfere with each other. 5) Multiple high-gain antennas (each depicted in FIG. 2) may be combined to form the antenna array 4 depicted in FIG. 6, so as to achieve better gain while the effect of circular polarization can be obtained without obvious cracking of the scattering parameters in the operating frequency band of the antenna array 4.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A high-gain antenna, comprising:

a first substrate, a second substrate, a ground layer and a third substrate that are stacked from top to bottom;

a driving patch that is disposed on a lower surface of said first substrate and that has a circular shape;

a first feed-in line and a second feed-in line that are disposed on a lower surface of said third substrate; and a first feed-out probe and a second feed-out probe, each of which extends from a lower surface of said driving patch from top to bottom, and penetrates said second substrate, said ground layer and said third substrate, so that said first feed-out probe is in contact with said first feed-in line and said driving patch, and that said second feed-out probe is in contact with said second feed-in line and said driving patch;

wherein, when a first signal and a second signal are respectively fed to said first feed-in line and said second feed-in line, the first signal is transmitted to said driving patch through said first feed-out probe, the second signal is transmitted to said driving patch through said second feed-out probe, and said driving patch outputs an output electromagnetic wave based on the first signal and the second signal, and wherein the high-gain antenna further comprises a third feed-out probe, the third feed-out probe extending from said lower surface of said driving patch, from top to bottom, and penetrates said second substrate, said ground layer and said third substrate, said third feed-out probe being configured to isolate the first signal that passes through said first feed-out probe from the second signal that passes through said second feed-out probe.

2. The high-gain antenna as claimed in claim 1, further comprising a parasitic patch that is disposed on an upper surface of said first substrate, that has a circular shape, and that is adapted to broaden an operating frequency band of said high-gain antenna.

3. The high-gain antenna as claimed in claim 2, wherein a projection of a center of said parasitic patch on said driving patch coincides with a center of said driving patch.

4. The high-gain antenna as claimed in claim 3, wherein a diameter of said parasitic patch is smaller than a diameter of said driving patch.

5. The high-gain antenna as claimed in claim 2, wherein said ground layer, said driving patch, said first feed-in line, said second feed-in line, said first feed-out probe, said second feed-out probe and said parasitic patch are made of metal.

6. The high-gain antenna as claimed in claim 1, wherein said third feed-out probe is disposed between said first feed-out probe and said second feed-out probe, and a minimum distance from said third feed-out probe to a center of said driving patch is smaller than a minimum distance from any one of said first feed-out probe and said second feed-out probe to said center of said driving patch.

7. The high-gain antenna as claimed in claim 1, wherein said ground layer, said driving patch, said first feed-in line, said second feed-in line, said first feed-out probe, said second feed-out probe and said third feed-out probe are made of metal.

8. The high-gain antenna as claimed in claim 1, wherein said first substrate, said second substrate and said third substrate are made of a dielectric material.

9. The high-gain antenna as claimed in claim 1, wherein said ground layer, said driving patch, said first feed-in line, said second feed-in line, said first feed-out probe and said second feed-out probe are made of metal.

10. An antenna array, comprising:

a first antenna, a second antenna, a third antenna and a fourth antenna, each including said high-gain antenna as claimed in claim 1;

wherein a center of said second antenna is aligned with a center of said first antenna in a first direction, and said second antenna is offset from said first antenna in a counterclockwise direction by 90 degrees;

wherein a center of said third antenna is aligned with the center of said second antenna in a second direction, and said third antenna is offset from said second antenna in a counterclockwise direction by 90 degrees; and wherein a center of said fourth antenna is aligned with the center of said third antenna in the first direction, and said fourth antenna is offset from said third antenna in a counterclockwise direction by 90 degrees.

11. The antenna array as claimed in claim 10, wherein, with respect to each of said first antenna, said second antenna, said third antenna and said fourth antenna, said high-gain antenna further includes a parasitic patch that is disposed on an upper surface of said first substrate, that has a circular shape, and that is configured to broaden an operating frequency band of said high-gain antenna.

12. The antenna array as claimed in claim 10, wherein, with respect to each of said first antenna, said second antenna, said third antenna and said fourth antenna, said first substrate, said second substrate and said third substrate are made of a dielectric material.

* * * * *